United States Patent
Modi et al.

(10) Patent No.: US 11,671,640 B1
(45) Date of Patent: Jun. 6, 2023

(54) ENHANCED RECOGNITION OF CONTENT AUDIENCES

(71) Applicant: Amazon Technologies, Inc., Seattle, WA (US)

(72) Inventors: Kirtan Modi, Seattle, WA (US); Robert James Victor, Brookville, PA (US); Vykunth Ashok, Bellevue, WA (US); Xinyu Zhou, Bellevue, WA (US); Qie Hu Huang, Sunnyvale, CA (US); Shuang Li, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/457,024

(22) Filed: Nov. 30, 2021

(51) Int. Cl.
*H04N 21/262* (2011.01)
*H04N 21/258* (2011.01)
*H04N 21/442* (2011.01)
*H04N 21/81* (2011.01)

(52) U.S. Cl.
CPC . *H04N 21/26241* (2013.01); *H04N 21/25883* (2013.01); *H04N 21/44218* (2013.01); *H04N 21/812* (2013.01)

(58) Field of Classification Search
CPC ................................................ H04N 21/26241
See application file for complete search history.

(56) References Cited

U.S. PATENT DOCUMENTS

2017/0208370 A1* 7/2017 Ray ................. H04N 21/266
2021/0281907 A1* 9/2021 Hoffert ............ H04N 21/2668

\* cited by examiner

*Primary Examiner* — Michael H Hong
(74) *Attorney, Agent, or Firm* — Eversheds Sutherland (US) LLP

(57) ABSTRACT

Devices, systems, and methods are provided for audience recognition. A method may include receiving over-the-top (OTT) advertisement impression data comprising metadata and content of advertisement bid requests, the metadata indicative of scheduled OTT media presentation; receiving user activity data indicative of day-part times when viewers watch content absent from the OTT advertisement impression data; generating, based on the OTT advertisement impression data, a first demographic probability vector; generating, based on the user activity data, a second demographic probability vector; generating, based on a combination of the first demographic probability vector and the second demographic probability vector, a third demographic probability vector, each entry of the third demographic probability vector indicative of a third probability that a viewer is in a respective age range; and generating an indication of the third demographic probability vector.

20 Claims, 5 Drawing Sheets

ENHANCED RECOGNITION OF CONTENT AUDIENCES

BACKGROUND

In video advertising, some advertisement delivery systems rely on impressions to determine how often an advertisement is presented. However, when homes have multiple viewers, advertisement frequency control is complicated in part by the inability of some advertisement delivery systems to determine whether advertisements were presented to particular viewers. For example, some advertisement delivery systems may be unable to discern whether an advertisement was presented to a first viewer or a second user when both users share an account. In addition, some advertisement delivery systems may lack the ability to determine a combined advertisement frequency based on whether an advertisement is presented using multiple mediums.

Figure 1:
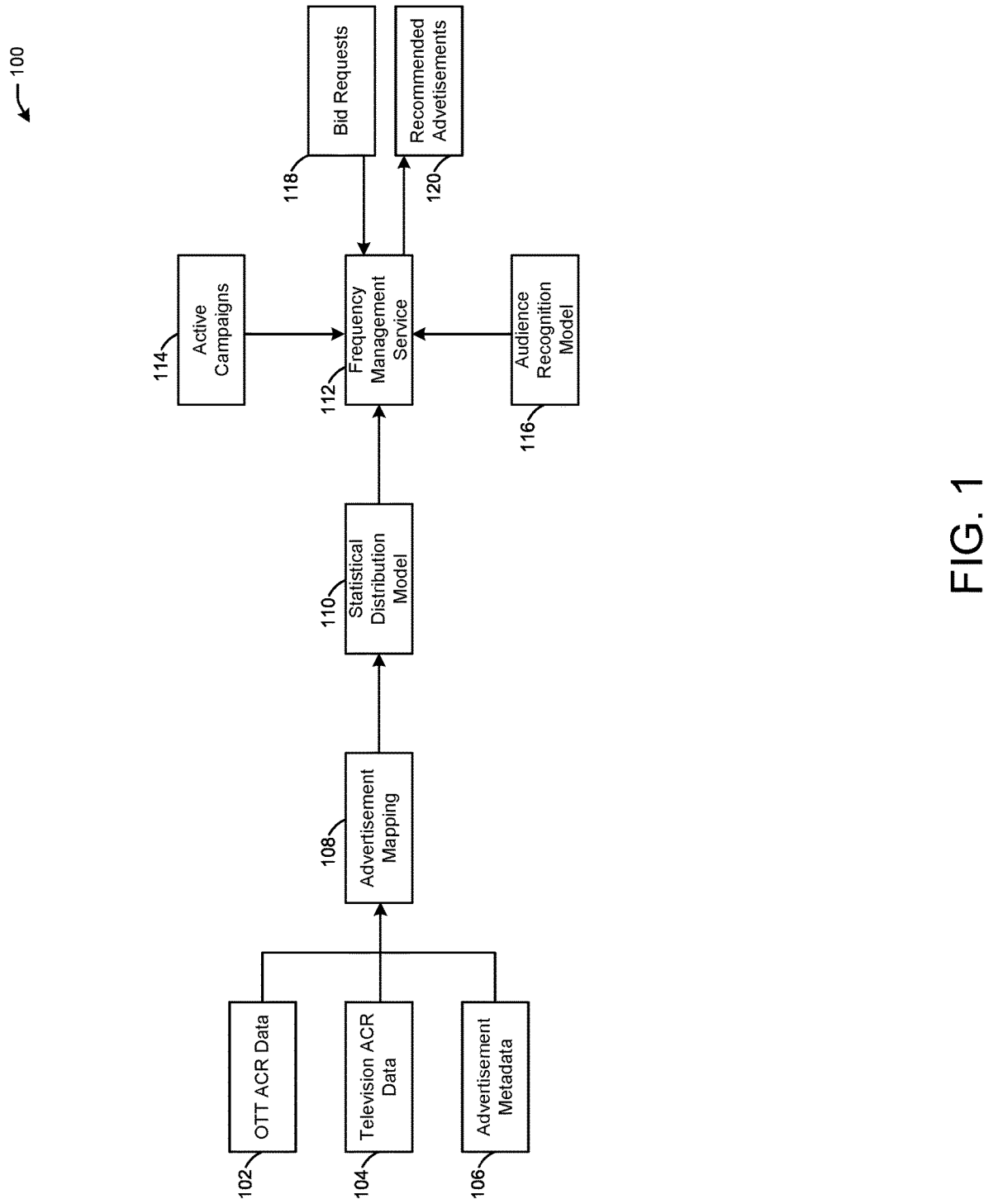
FIG. 1 shows an example system for mapping advertisements and recognizing audiences, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for recognizing content audiences.

Over-the-top (OTT) advertising refers to advertising delivered directly to viewers, in contrast with pre-planned advertising based on broadcast schedules dependent on content providers. For example, OTT advertising may be delivered over the Internet using streaming video applications and devices. OTT media services (e.g., streaming media applications) may deliver content using OTT techniques.

Some OTT advertisement delivery systems implement frequency cap control (e.g., limits on the number of times an advertisement is presented during a time period) based on advertisement impressions that indicate that an advertisement has been presented.

Some homes may have multiple viewers (e.g., parents, children, etc.), so frequency cap control may be implemented at a household level to determine total advertisement frequency for a given household. Advertisement impressions may correspond to multiple viewers in a same household, using both OTT and traditional television delivery, presenting challenges for some advertisement delivery systems when managing frequency of advertisement presentation.

In some situations, a system may not be able to determine whether a viewer has viewed an advertisement. For example, when the viewer uses a third-party website without a cookie, the system may see that the viewer went to/from the site, but not necessarily whether the viewer saw an advertisement there. More specifically, when a user watches video using a third-party web browser (e.g., and the system does not have a cookie for the browser) or other third-party platform, the system may be aware of a number of users who watch the type/genre of the video and what other content they view, and what advertisements were served for that other content. Therefore, the system may presume a likelihood that the user was presented with the advertisement when using the third-party browser. In addition, because a household may have multiple viewers, systems may not be able to identify the actual viewer or viewers to whom content was presented. For example, knowing that content was presented via a user account may not be dispositive in determining which user of the user account, when there are multiple users, viewed the content.

There is therefore a need for enhanced advertisement delivery control using audience recognition.

In one or more embodiments, an advertisement delivery system may receive real-time audience recognition data for both OTT and television advertisements to determine a total delivered frequency of advertisements in respective households within any time window. More generally, the advertisement delivery system may be an OTT system with access to OTT impressions based on content presented to OTT users affiliated with the system. However, users may be presented content using other mediums, such as television, web browsers, and the like, for which the system may not have impression data. The system may receive user activity data, such as television survey data, web browser data, and the like, indicating content that users view at particular times. Using the total delivery frequency (e.g., OTT impressions plus other content views indicated by the user activity data), the advertisement delivery system may update OTT advertisement frequency to enable a cross-channel (e.g., OTT, television, and Internet) frequency cap for advertisements and advertisement campaigns at a household level.

In one or more embodiments, the advertisement delivery system may manage frequency of advertisement exposure to users without knowing deterministic identities (e.g., which member of a household is the viewer). Instead, the advertisement delivery system may generate and use conditional probabilities indicative of the likelihood that a user has seen an advertisement. For example, the advertisement delivery system may have access to user account data (e.g., for OTT streaming media users), and the user account data may provide user demographic information. The advertisement delivery system also may have access to OTT impression data and bid requests, including contextual and/or household features. For example, the advertisement delivery system may determine, using OTT impression data, that content of a particular genre was presented using an OTT device during a particular day-part. The user activity data also may indicate when users of other applications or systems (e.g., not the OTT streaming system) may view content, using a particular device or application, and the genre of content presented. The advertisement delivery system may convert the delivered frequency of content exposure at a household level to a statistical distribution model (e.g., heat map) to estimate a user level cross-channel frequency for any content. The statistical distribution model and an audience recognition model may be inputs to a frequency management recommendation service that may facilitate the selection of content, such as advertisements and campaigns.

In one or more embodiments, inputs to the audience recognition model of the advertisement delivery system may include OTT impression log data (including advertisement metadata and bid request content), consumer survey data (e.g., provided with user consent), user data from a video platform (with user consent), and first-person audience behavior segmentation data. The advertisement delivery system may assume (1) that in multi active user (MAU) households, each active user may use their own account to view OTT; (2) an account user's provided demographic information is accurate; and (3) viewing behavior of viewers and preferences on OTT and television are similar. Based on the inputs and assumptions, the advertisement delivery system may generate as an output a probability distribution of a viewer's demographic, along with performance metrics such as precision/recall of a predicted viewer demographic, and an offline test dataset.

In one or more embodiments, the audience recognition model of the advertisement delivery system may be a classification model that predicts demographics (e.g., age, gender, etc.) groups of a video audience in a bid request to a vector of probabilities. The advertisement delivery system may define D non-overlapping demographic groups whose union is equal to a target demographic segment. The advertisement delivery system may use $b \in R^D$ to represent viewer ground truth demographic groups, and may use $\hat{b} \in R^D$ to represent viewer demographics estimated by the audience recognition model. Both b and $\hat{b}$ may represent probability vectors (e.g., $1^T b = 1^T \hat{b} = 1$). For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model may predict a viewer's demographic probability as $\hat{b}$=[0.05, 0.45, 0.2, 0.3].

In one or more embodiments, the audience recognition model may represent an ensemble of multiple models, for example, one trained on first-person active OTT data, and another trained on third-person data (e.g., third-party provided user survey data). The audience recognition model may let $\hat{b}_i$ be an estimated demographic probability from the i-th model in the model ensemble. $\hat{b}_i$ probabilities may be combined in an additive or multiplicative manner to generate a final estimate $\hat{b}$. For example, using two models in the ensemble, an additive approach may be represented by Equation (1): $\hat{b}=a\hat{b}_1+(1-a)$, where $0 \le a \le 1$, and a multiplicative approach may be represented by Equation (2): $\hat{b}=\text{softmax}(\hat{b}_1 \odot \hat{b}_2)$, where $\odot$ represents element-wise multiplication.

In one or more embodiments, the audience recognition model may be trained using OTT audience panel data to provide an approximate source of truth for OTT viewer demographics. The audience panel may include active single adult households and MAU households. An active user may be a user who has at least N OTT impressions during a time window. A single adult household may have only one adult according to user data, and the model may assume that the true viewer is the account owner. An MAU household may have at least two adults according to user data, and at least two distinct active users. The model may assume that each active user uses their own user account to watch OTT. Any impression in this dataset may be labeled with exactly one demographic group, so the ground truth demographic representation for the above-described scenario may be b=[0, 0, 0, 1]. The model may use a combination of contextual and household features. Contextual features may include content genre, content rating, device type, hour of bid request, day-part (e.g., time segments of a day), weekend/weekday, month, geographic location, and the like. Household features may include the number of adults in the household, presence and age of children, household income, and the like. For offline model training and testing, contextual features may be available in OTT impression logs, and household features may be available. The features may be included in the bid request, but must not include age and gender of individual viewers, as those are target labels for the model to predict. In particular, user account-level data may include demographic data for the user to whom the user account is registered, but because the user account may be shared by multiple users (e.g., a multi-user household), the age and gender data may not be available for the specific individual users of the user account.

In one or more embodiments, the audience recognition model may be trained using syndicated survey data. The survey questions may cover television viewing behaviors, but not OTT viewing behavior. In this manner, the model may predict the true demographics of an OTT viewer. The model may assume that an individual's viewing behavior and preferences are similar for OTT and television viewing (e.g., if a viewer watches action movies on television, the viewer watches action movies on OTT). The survey data may not include impression-level data. The system may extract labeled data for training the model. For example, the survey data may indicate whether a person watches television during particular day-parts during the week or weekend, and the genres of programming that the person watches. The system may sum the values (e.g., with weighting) for any combination of [demographic group (age, gender), time period (day-part, weekday/weekend), program genre]. The system may normalize along the demographic group axis, providing labeled data two features [time period, program genre], and the labels may represent probabilities of different demographic groups like b=[0.5, 0.1, 0.2, 0.2]. For offline model training and testing, the features may be available from the survey data, and may be available in a bid request.

In one or more embodiments, the audience recognition model may be validated in multiple ways when offline: (1) as a standalone audience recognition model, (2) as a component in an integrated in-flight advertisement delivery simulation system. For the standalone technique, active OTT panel data may be collected by the system for a time period, and randomly split into a training dataset and a held-out test dataset. Precision and recall metrics on the held-out test dataset may be used to measure the performance of the model and to compare the performance to a production system. By assumption, the active OTT panel dataset may include OTT impressions where the actual viewer is the registered user, implying that the production system would achieve perfect targeting on the active OTT panel dataset. Therefore, the system may not directly compare the model's prediction accuracy on the entire active OTT panel test dataset against that of the production system. Instead, the system may use the model to predict the most likely demographic group for each bid request in the test dataset, then compare the on-target rate (OTR) from the model with the default production system for any target demographic segment. The OTR may be a measurement of whether a respondent in a dataset is in a target demographic group.

In one or more embodiments, the system may include a synthetic audience model and synthetic panel. The synthetic audience model may learn from real audience data (e.g., of prior audiences), and may record information for the audience group and their behaviors across channels. The synthetic audience model may represent audience growth, demographics, and audience viewership with day-parts in a time-varying manner. The generation of the synthetic audience may replicate the original impression data, which may be deleted periodically (e.g., due to privacy policy). The synthetic audience model may include a hourly audience growth model, viewership distribution over different household composition groups, multi-user household viewership distribution, and co-viewership distribution.

In one or more embodiments, the system may distribute original impression data into household composition groups and determine the viewership behavior of each group. H may be the set of all households in the original impression data, and $C_H$ may be the number of households in H. To clarify the usage of household composition, the system may divide OTT users (e.g., users of an OTT media service) into N disjoint demographic groups G, where $g_i \in G$ represents a demographic group (e.g., female: aged 18-34, etc.). The system may define household composition as a N-length vector $m=[m_1, \ldots, m_N]$, where $m_i \in R$ represents the number of household members belonging to a demographic group $g_i$. There are a finite number of unique household compositions, so it may be beneficial to categorize H household composition groups M, where M is the set of all household composition groups, and each $M \in M$ represents a unique household composition group. Day-parts may be represented by D, where $D \in D$ is a specific day-part period. For each M, the system may divide into multiple subgroups, where each subgroup may represent an OTT viewership behavior during a specific day-part. The system may, for simplicity, consider an hourly average watching time during a day-part on OTT as the viewership behavior, represented by $T^D$. The system may characterize households in any subgroup as $H_{M T^D}$. For example, if $g_1$=F18–34, M=[1, 0, ..., 0], D=primetime day-part, then $H_{M T^D}$ represents the households with a single household member who is female, aged 18-34 whose hourly average OTT viewing time is T during prime time. The $H_{M T^D}$ values may be disjoint, and $H = \cup H_{M T^D}$. $C_{M T^D}$ may represent the number of households in $H_{M T^D}$.

In one or more embodiments, there may be a difference between OTR and segment-level validation because (1) a different adult in a respondent's household and in the target demographic group may be exposed instead of the actual respondent, lowering OTR, and (2) other adults in the respondent's household and in the target demographic group may have been co-viewing with the respondent. To account for these scenarios, the system may calibrate viewership distribution. Segment-level validation may be determined by dividing a number of OTT system users by the number of matched survey respondents in each demographic group.

In one or more embodiments, to calibrate viewership distribution for multi-user households, using OTT panel data, the system may generate a multiuser household viewership distribution. Using H as the set of all household compositions in the MAU households in the panel, and $C_H$ as the households in the MAU whose composition is H, for any $H \in H$, the system may use $h=[h_1, \ldots, h_N]$ to represent each user in the household, and $\{g_1, \ldots, g_n\}$ to represent the corresponding demographic group. Given a specific day-part, the system may determine a probability of viewing during the day-part as $\{P_1, \ldots, P_n\}$. An input to the algorithm may include demographic groups G, day-part categories D, and OTT panel data. The output may be a household viewership distribution P using the algorithm:

For each $H \in H$,
Determine the number of households in $C_H$;
For each $h_i \in H$, $$P_i = \frac{\text{number of impressions exposed to } h_i}{\text{number of impressions exposed to } H};$$

$P = P \cup \{g_1, \ldots, g_n, P_1, \ldots, P_n\}$.

In one or more embodiments, to calibrate viewership distribution for co-viewership distribution, the system may map multiple levels of survey answers (e.g., strongly agree, somewhat agree, somewhat disagree, strongly disagree) to probabilities $\{P_1, P_2, P_3, P_4\}$. The number of adults in the labeled third-party survey data and the number of adults in labeled OTT user panel (e.g., survey) data as demographic group g may be represented as $M^g$, $A^g$ respectively. $H_i$ may represent the household of respondent i and $H_i^g$ may represent the number of demographic group g adults in $H_i$ as $H_i^g$. Matching with $OTR_g$, the system may estimate $\{P_1, P_2, P_3, P_4\}$ using $$\frac{\sum_i 1_{g \in H_i \Sigma_j P_j H_i^g + M^g}}{A^g} = OTR_g. \qquad \text{Equation (3)}$$

In one or more embodiments, the techniques described herein may enhance the probabilistic determination of whether a viewer is likely to have seen an advertisement based on some other information, and the probabilistic determination of the demographic group of a viewer. Using the enhanced probabilities, the system may enforce advertisement frequency cap controls.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 shows an example system 100 for mapping advertisements and recognizing audiences, in accordance with one or more example embodiments of the present disclosure.

Referring to FIG. 1, the system 100 may include OTT automatic content (ACR) data 102, television ACR data 104 (e.g., viewer survey data), and advertisement metadata 106 (e.g., indicative of scheduled OTT content) as inputs to an advertisement mapping service 108. The combination of the OTT ACR data 102 and the television ACR data 104 may allow the system 100 to determine the total delivered frequency (e.g., OTT plus television) for any household within any specified time window (e.g., day-part), allowing for enforcement of cross-channel frequency caps at a household level. The advertisement mapping service 108 may generate a statistical distribution model 110 (e.g., a heat map) estimating cross-channel frequency of presentation of content (e.g., advertisements).

Still referring to FIG. 1, the system 100 may input the statistical distribution model 110 to a frequency management service 112 (e.g., to enforce frequency caps). The frequency management service 112 also may receive active advertisement campaign status data 114 and an audience recognition model 116 as inputs. Using information included in bid requests 118, along with the other inputs, the frequency management service 112 may select recommended advertisements 120 or other content (e.g., for campaigns).

In one or more embodiments, the audience recognition model 116 may be a classification model that predicts demographics (e.g., age, gender, etc.) groups of a video audience identified in a bid request (e.g., of the bid requests 118) to a vector of probabilities. The system 100 may define D non-overlapping demographic groups whose union is equal to a target demographic segment. The system 100 may use $b \in R^D$ to represent viewer ground truth demographic groups, and may use $\hat{b} \in R^D$ to represent viewer demographics estimated by the audience recognition model 116. Both b and $\hat{b}$ may represent probability vectors (e.g., $1^T b = 1^T \hat{b} = 1$). For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model 116 may predict a viewer's demographic probability as $\hat{b}$=[0.05, 0.45, 0.2, 0.3].

In one or more embodiments, the audience recognition model 116 may represent an ensemble of multiple models, for example, one trained on first-person active OTT data (e.g., the OTT ACR data 102, and another trained on third-person data (e.g., third-party provided user survey data). The audience recognition model 116 may let $\hat{b}_i$ be an estimated demographic probability from the i-th model in the model ensemble. $\hat{b}_i$ probabilities may be combined in an additive or multiplicative manner to generate a final estimate b. For example, using two models in the ensemble, an additive approach may be represented by Equation (1), and a multiplicative approach may be represented by Equation (2).

In one or more embodiments, the audience recognition model 116 may be trained using OTT audience panel data (e.g., the OTT ACR data 102) to provide an approximate source of truth for OTT viewer demographics. The audience panel may include active single adult households and MAU households. An active user may be a user who has at least N OTT impressions during a time window. A single adult household may have only one adult according to user data, and the model may assume that the true viewer is the account owner. An MAU household may have at least two adults according to user data, and at least two distinct active users. The audience recognition model 116 may assume that each active user uses their own user account to watch OTT. Any impression in the OTT ACR data 102 may be labeled with exactly one demographic group, so the ground truth demographic representation for the above-described scenario may be b=[0, 0, 0, 1]. The audience recognition model 116 may use a combination of contextual and household features. Contextual features may include content genre, content rating, device type, hour of bid request, day-part (e.g., time segments of a day), weekend/weekday, month, geographic location, and the like. Household features may include the number of adults in the household, presence and age of children, household income, and the like. For offline model training and testing, contextual features may be available in OTT impression logs, and household features may be available. The features may be included in the bid requests 118, but must not include age and gender, as those are target labels for the model to predict.

In one or more embodiments, the audience recognition model 116 may be trained using syndicated survey data (e.g., the television ACR data 104). The survey questions may cover television viewing behaviors, but not OTT viewing behavior. In this manner, the audience recognition model 116 may predict the true demographics of an OTT viewer. The audience recognition model 116 may assume that an individual's viewing behavior and preferences are similar for OTT and television viewing (e.g., if a viewer watches drama movies on television, the viewer watches drama movies on OTT). The survey data may not include impression-level data. The system 100 may extract labeled data for training the model. For example, the survey data may indicate whether a person watches television during particular day-parts during the week or weekend, and the genres of programming that the person watches. The system 100 may sum the values (e.g., with weighting) for any combination of [demographic group (age, gender), time period (day-part, weekday/weekend), program genre]. The system 100 may normalize along the demographic group axis, providing labeled data two features [time period, program genre], and the labels may represent probabilities of different demographic groups like b=[0.5, 0.1, 0.2, 0.2]. For offline model training and testing, the features may be available from the survey data, and may be available in a bid request.

In one or more embodiments, the audience recognition model 116 may be validated in multiple ways when offline: (1) as a standalone audience recognition model, (2) as a component in an integrated in-flight advertisement delivery simulation system. For the standalone technique, active OTT panel data may be collected by the system for a time period, and randomly split into a training dataset and a held-out test dataset. Precision and recall metrics on the held-out test dataset may be used to measure the performance of the model and to compare the performance to a production system. By assumption, the active OTT panel dataset may include OTT impressions where the actual viewer is the registered user, implying that the production system would achieve perfect targeting on the active OTT panel dataset. Therefore, the system 100 may not directly compare the model's prediction accuracy on the entire active OTT panel test dataset against that of the production system. Instead, the system 100 may use the audience recognition model 116 to predict the most likely demographic group for each bid request in the test dataset, then compare OTR from the audience recognition model 116 with the default production system for any target demographic segment.

In one or more embodiments, the system 100 may include and/or be facilitated by a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, or the like.

Figure 2:
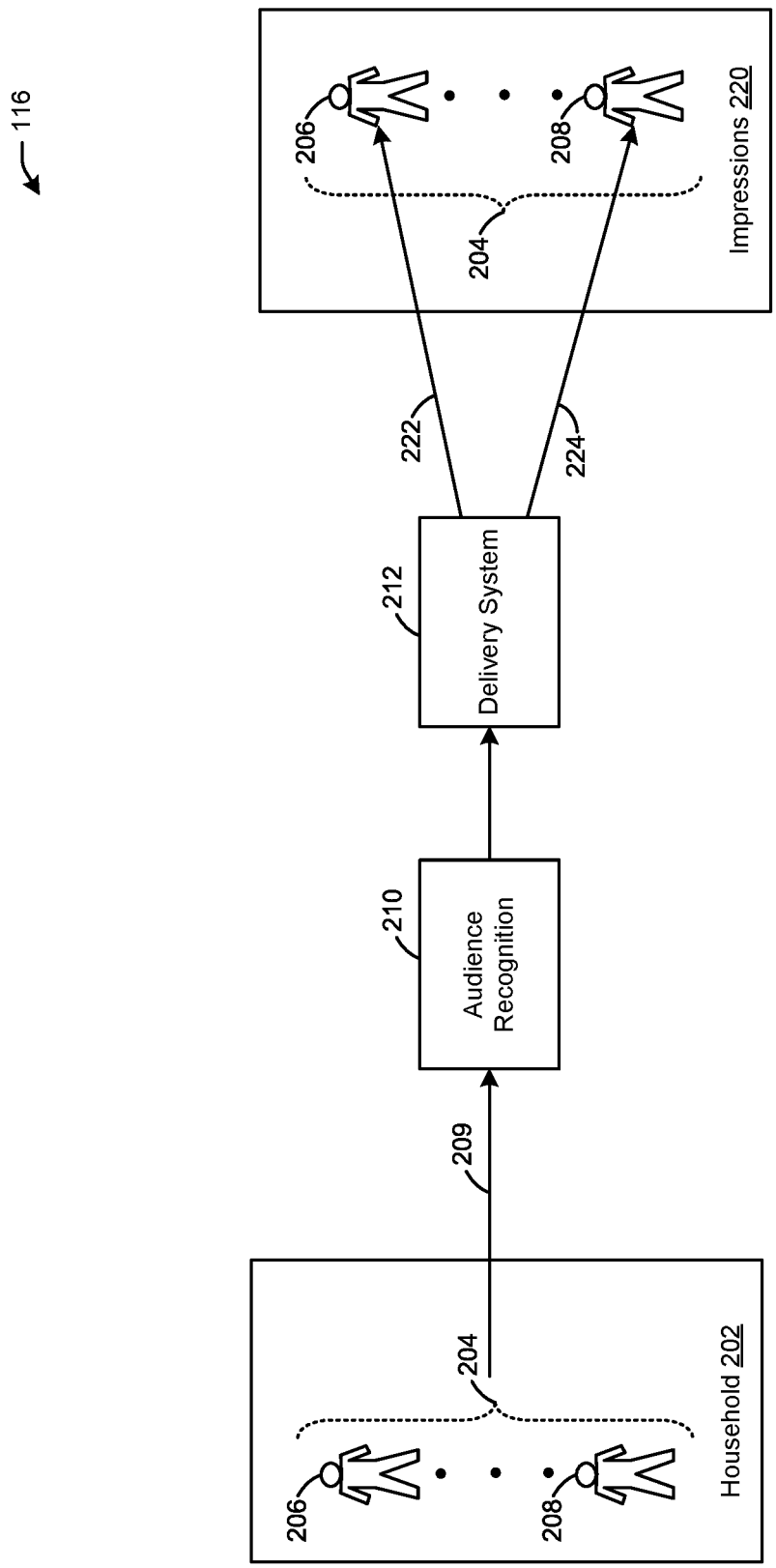
FIG. 2 shows the audience recognition model of FIG. 1, in accordance with one or more example embodiments of the present disclosure.

FIG. 2 shows the audience recognition model 116 of FIG. 1, in accordance with one or more example embodiments of the present disclosure.

Referring to FIG. 2, the audience recognition model 116 may include a household 202 (e.g., representing one of many households) having multiple viewers 204 representing different audiences (e.g., viewer 206, viewer 208) who may view presented content (e.g., OTT content). The household 202 may provide input data 209 to an audience recognition engine 210. The input data 209 may include OTT impression log data, survey data, streaming service user data (e.g., the viewers 204 may represent users having user accounts with an OTT streaming service), and first-person data provided by the viewers 204. A delivery system 212 may determine the probabilities that the person who viewed content (e.g., the viewer 206) represents the viewer 204 or the viewer 208. For example, impressions 220 for content presented to the household 202 may be at the household level, meaning that any viewer of the household 202 may have been presented the content, but not necessarily any/all viewers of the household 202. Probability 222 may represent the likelihood that the person who was presented content (e.g., as represented by an impression) is the viewer 206, and probability 224 may represent the likelihood that the person who was presented the content is the viewer 208. In this manner, the audience recognition model 116 may determine a demographic probability vector whose entries represent the respective probabilities of a viewer being of a respective demographic. In this manner, the output of the audience recognition model 116 may include a probability distribution of a viewer's demographic.

In one or more embodiments, the audience recognition model 116 may assume that each active user of a MAU household (e.g., the household 202) may have their own user account for presenting OTT media, and that the OTT user account provides accurate demographic information. The audience recognition model 116 may assume that viewing behavior and preferences are similar when a viewer watches OTT programming versus television programming.

In one or more embodiments, the audience recognition model 116 may be a classification model that predicts demographics (e.g., age, gender, etc.) groups of a video audience in a bid request to a vector of probabilities. For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model 116 may predict a viewer's demographic probability as $\hat{b}$=[0.05, 0.45, 0.2, 0.3].

In one or more embodiments, the audience recognition model 116 may represent an ensemble of multiple models, for example, one trained on first-person active OTT data, and another trained on third-person data (e.g., third-party provided user survey data). The audience recognition model 116 may let $\hat{b}_i$ be an estimated demographic probability from the i-th model in the model ensemble. $\hat{b}_i$ probabilities may be combined in an additive or multiplicative manner to generate a final estimate $\hat{b}$. For example, using two models in the ensemble, an additive approach may be represented by Equation 1, and a multiplicative approach may be represented by Equation 2.

In one or more embodiments, the audience recognition model 116 may be trained using OTT audience panel data to provide an approximate source of truth for OTT viewer demographics. The audience panel may include active single adult households and MAU households. An active user may be a user who has at least N OTT impressions during a time window. A single adult household may have only one adult according to user data, and the model may assume that the true viewer is the account owner. An MAU household may have at least two adults according to user data, and at least two distinct active users. The audience recognition model 116 may assume that each active user uses their own user account to watch OTT. Any impression in this dataset may be labeled with exactly one demographic group, so the ground truth demographic representation for the above-described scenario may be b=[0, 0, 0, 1]. The audience recognition model 116 may use a combination of contextual and household features. Contextual features may include content genre, content rating, device type, hour of bid request, day-part (e.g., time segments of a day), weekend/weekday, month, geographic location, and the like. Household features may include the number of adults in the household, presence and age of children, household income, and the like. For offline model training and testing, contextual features may be available in OTT impression logs, and household features may be available. The features may be included in the bid request, but must not include age and gender, as those are target labels for the model to predict.

In one or more embodiments, the audience recognition model 116 may be trained using syndicated survey data. The survey questions may cover television viewing behaviors, but not OTT viewing behavior. In this manner, the audience recognition model 116 may predict the true demographics of an OTT viewer. The audience recognition model 116 may assume that an individual's viewing behavior and preferences are similar for OTT and television viewing (e.g., if a viewer watches comedy shows on television, the viewer watches comedy shows on OTT). The survey data may not include impression-level data.

Figure 3:
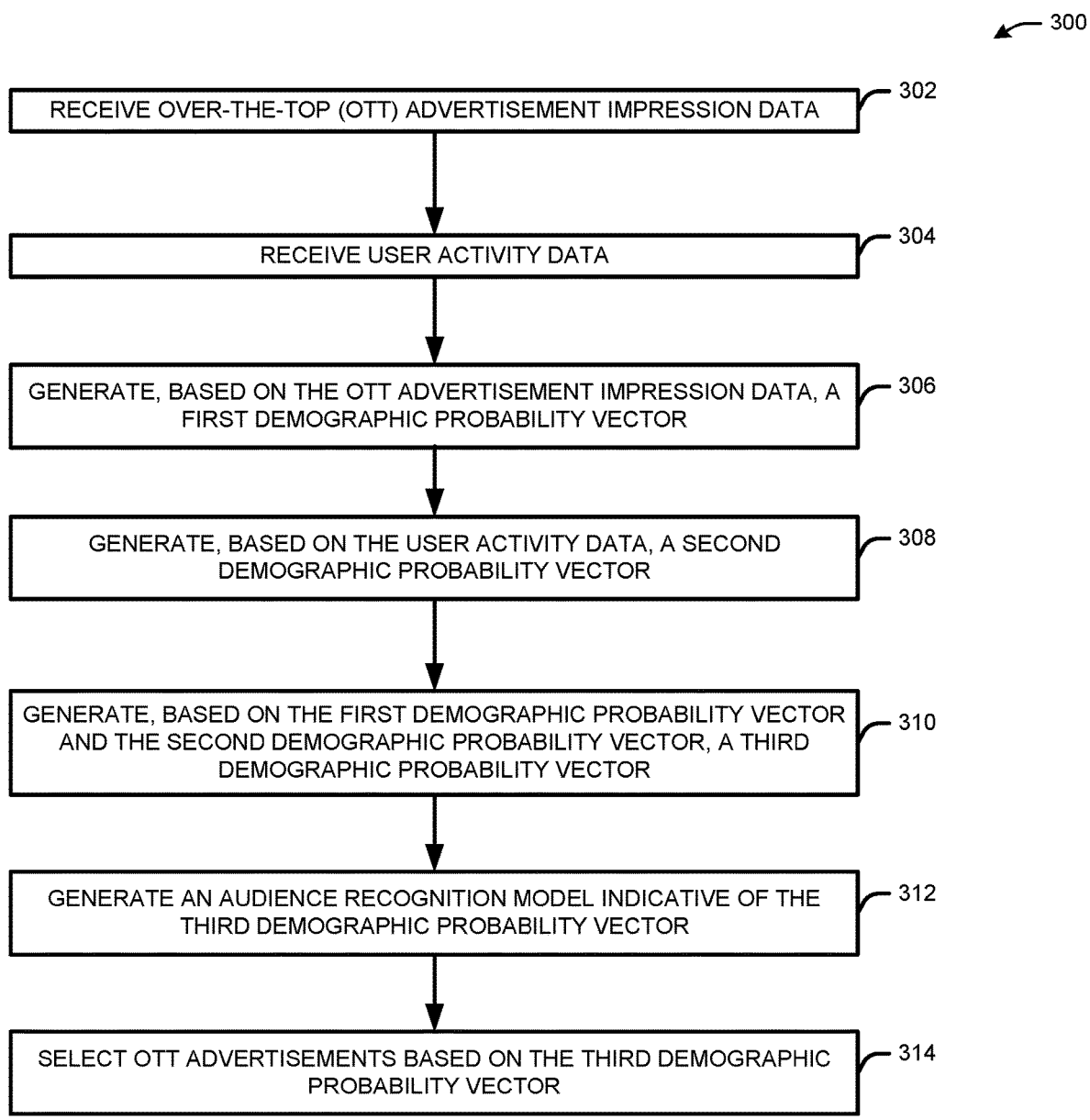
FIG. 3 illustrates a flow diagram for a process for recognizing audiences, in accordance with one or more example embodiments of the present disclosure.

FIG. 3 illustrates a flow diagram for a process 300 for recognizing audiences, in accordance with one or more example embodiments of the present disclosure.

At block 302, a device (or system, e.g., the system 100 of FIG. 1) may receive OTT advertisement impression data (e.g., the OTT ACR data 102 of FIG. 1), including advertisement metadata and bid request content. The bid request content may include household and/or contextual data, excluding age and gender, as those are target labels to be predicted.

At block 304, the device may receive user activity data, such as television survey data or other data such as web browser or application data (e.g., indicating when a user viewed content using a particular device or application). The device may be affiliated with an OTT streaming service, and may have OTT user data as provided by the OTT users (e.g., account data). However, the device may not provide television (e.g., using cable and/or optical systems), so the television survey data may be provided by a third party. The survey questions may cover television viewing behaviors, but not OTT viewing behavior. In this manner, the model may predict the true demographics of an OTT viewer. The model may assume that an individual's viewing behavior and preferences are similar for OTT and television viewing (e.g., if a viewer watches action movies on television, the viewer watches action movies on OTT). The survey data may not include impression-level data. The system may extract labeled data for training the model. For example, the survey data may indicate whether a person watches television during particular day-parts during the week or weekend, and the genres of programming that the person watches.

At block 306, the device may generate, based on the OTT advertisement impression data, a first demographic probability vector. The device may label any impression with a respective demographic group. The device may determine respective probabilities that the content associated with the impression was presented to respective demographic groups. Contextual and/or household features may be included in bid requests that correspond to the impressions, and the features may lack age and gender data. In this manner, the device may estimate a probability that content was presented (e.g., as indicated by an impression) to a viewer in a particular demographic group based on the contextual and/or household data. For example, when content is of a particular genre, was presented during a particular day-part, using a particular application or device, and/or when the household associated with the account to which the content was presented (e.g., as indicated by an impression) has a particular number of viewers of particular demographics, the device may assign probabilities of the viewer to respective demographic groups. For example, a kids program may be more likely to be viewed by a younger demographic. A law enforcement drama may be more likely to be viewed by an older demographic. Content viewed later at night may be more likely to be viewed by an older demographic. For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model may predict a viewer's demographic probability as $\hat{b}_1$=[0.05, 0.45, 0.2, 0.3]. The first demographic probability vector may be generated using a first audience recognition model trained using the OTT advertisement impression data.

At block 308, the device may generate, based on the user activity data, a second demographic probability vector. The first and second demographic probability vectors may include numeric entries, each of which indicates the probability of a viewer being in a particular demographic group. For example, demographic probability vector $\hat{b}_2$=[0.05, 0.45, 0.2, 0.3] indicates a 5% chance that the viewer is in a first demographic group, a 45% chance that the viewer is in a second demographic group, a 20% chance that the viewer is in a third demographic group, and a 30% chance that the viewer is in a fourth demographic group. Different numbers of demographic groups may be applied, and the sum of the entries of a demographic probability vector should add to 1 (e.g., 100%). The user activity data may indicate that a viewer watches a particular genre of content during particular day-parts. Because certain genres of content at certain day-parts are more likely to be viewed by certain demographics, as indicated by the user activity data, the device may assign probabilities that a viewer of any particular content presented at a particular time is part of any demographic group. In this manner, two different demographic probability vectors may be generated—one using OTT data, another using television data.

At block 310, the device may generate a third demographic probability vector based on the first and second demographic probability vectors. The third demographic probability vector may be generated using an additive approach or using a multiplicative approach that combines the two demographic probability vectors (e.g., the OTT vector and the television vector). For example, using two models in the ensemble, an additive approach may be represented by Equation (1): $\hat{b}=a\hat{b}_1+(1-a)$, where $0 \leq a \leq 1$, and a multiplicative approach may be represented by Equation (2): $b=\text{softmax}(\hat{b}_1 \odot \hat{b}_2)$, where $\odot$ represents element-wise multiplication.

At block 312, the device may generate an audience recognition model (e.g., the audience recognition model 116 of FIG. 1) indicative of the third demographic probability vector. Using one of the approaches in block 310, the device may generate a combined (e.g., total) cross-channel estimate represented by the third demographic probability vector b, in which the vector includes respective values each representing a probability that a viewer is in a particular demographic group. For example, when $\hat{b}$=[0.1, 0.5, 0.2, 0.2] indicates a 10% chance that the viewer is in a first demographic group, a 50% chance that the viewer is in a second demographic group, a 20% chance that the viewer is in a third demographic group, and a 20% chance that the viewer is in a fourth demographic group.

At block 314, as a result of the third demographic probability vector, the device may select OTT advertisements (e.g., using frequency caps). For example, when the third demographic probability vector indicates a probability greater than a threshold, such may indicate a likelihood that a person is in a demographic group. The device may manage frequency of advertisement exposure to users without knowing deterministic identities (e.g., which member of a household is the viewer). The combination of the OTT impression data and the television survey data may allow the device to determine the total delivered frequency (e.g., OTT plus television) for any household within any specified time window (e.g., day-part), allowing for enforcement of cross-channel frequency caps at a household level. The device may convert the delivered frequency of advertisement exposure at a household level to a statistical distribution model (e.g., heat map) to estimate a user level cross-channel frequency for any advertisements. The statistical distribution model and an audience recognition model may be inputs to a frequency management recommendation service of the device that may facilitate the selection of advertisements and campaigns.

Figure 4:
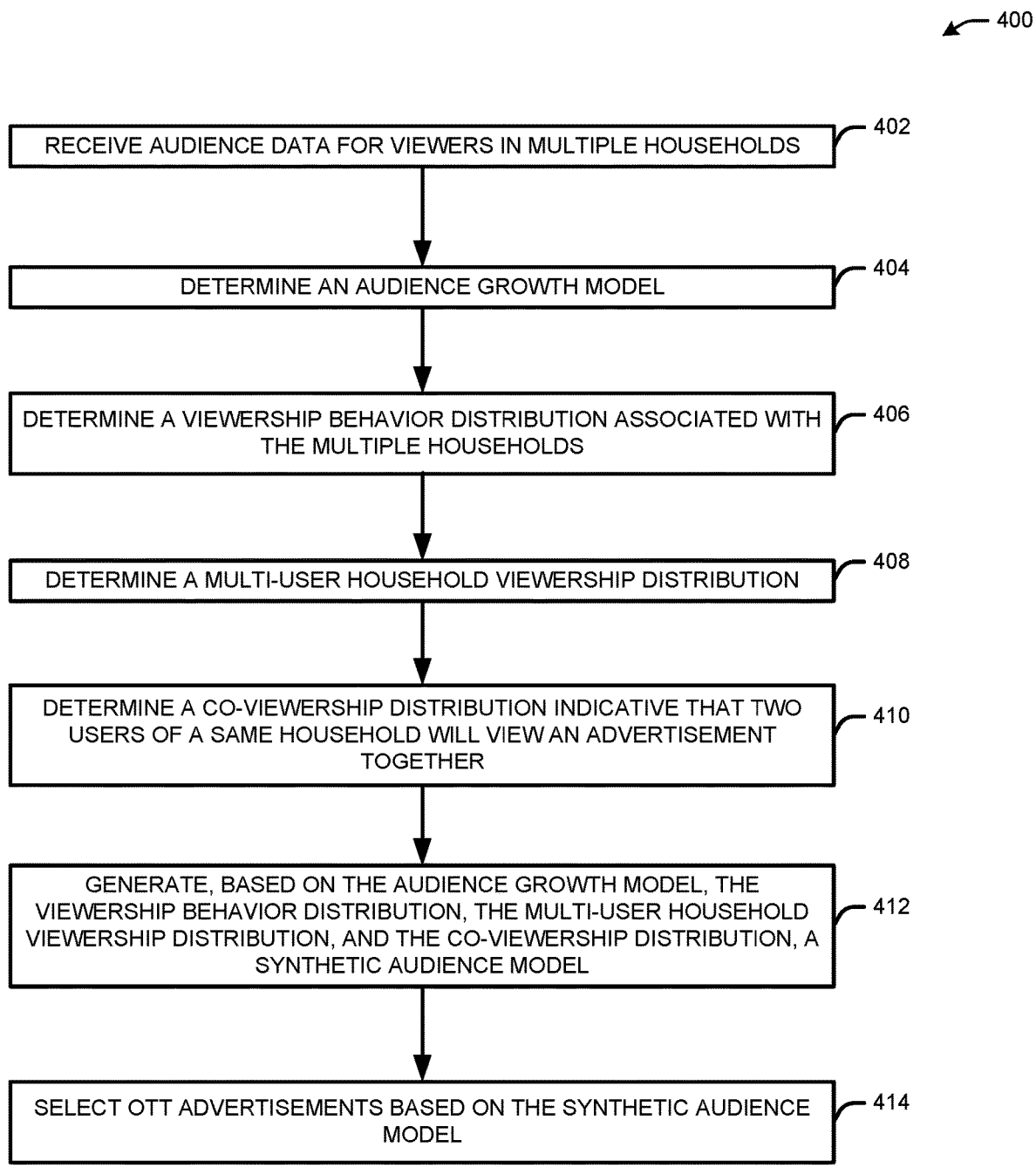
FIG. 4 illustrates a flow diagram for a process for recognizing audiences, in accordance with one or more example embodiments of the present disclosure.

FIG. 4 illustrates a flow diagram for a process 400 for recognizing audiences, in accordance with one or more example embodiments of the present disclosure.

At block 402, a device (or system, e.g., the system 100 of FIG. 1) may receive audience data from viewers in multiple households. The audience data may refer to actual, first-person data provided by viewers (e.g., users who watch OTT content), survey data, and/or user account data. The audience data may indicate audience growth, demographics, and audience viewership during various day-parts. The device may use the real audience data to replicate OTT impression data.

At block 404, the device may determine an audience growth model, which may indicate hourly audience growth. For example, hourly audience growth may indicate the number or percentage of viewers added during one or more day-parts. During prime time evening hours, for example, audiences may grow at different rates than daytime day-part audiences.

At block 406, the device may determine a viewership distribution associated with the multiple households. The viewership behavior distribution may be indicative of first viewership behavior associated with a first household composition and second viewership behavior associated with a second household composition. Household composition may be characterized as single adult households and/or MAU households. Household composition may be based on user account data, first-person data, survey data, or the like, indicating a number of users in a household. H may be the set of all households in the original impression data, and $C_H$ may be the number of households in H. To clarify the usage of household composition, the device may divide OTT users (e.g., users of an OTT media service) into N disjoint demographic groups G, where $g_i \in G$ represents a demographic group (e.g., female: aged 18-34, etc.). The system may define household composition as a N-length vector $m=[m_1, \ldots, m_N]$, where $m_i \in R$ represents the number of household members belonging to a demographic group $g_i$. There are a finite number of unique household compositions, so it may be beneficial to categorize H household composition groups M, where M is the set of all household composition groups, and each $M \in M$ represents a unique household composition group. Day-parts may be represented by D, where $D \in D$ is a specific day-part period. For each M, the device may divide into multiple subgroups, where each subgroup may represent an OTT viewership behavior during a specific day-part. The device may, for simplicity, consider an hourly average watching time during a day-part on OTT as the viewership behavior, represented by $T^D$. The device may characterize households in any subgroup as $H_{MT^D}$. For example, if $g_1$=F18–34, M=[1, 0, . . . , 0], D=primetime day-part, then $H_{MT^D}$ represents the households with a single household member who is female, aged 18-34 whose hourly average OTT viewing time is T during prime time. The $H_{MT^D}$ values may be disjoint, and $H = \cup\, H_{MT^D}$. $C_{MT^D}$ may represent the number of households in $H_{MT^D}$.

At block 408, the device may determine a multi-user household viewership distribution indicating probabilities that different viewers in a same household view content. Using H as the set of all household compositions in the MAU households in the panel, and $C_H$ as the households in the MAU whose composition is H, for any $H \in H$, the system may use $h=[h_1, \ldots, h_N]$ to represent each user in the household, and $\{g_1, \ldots, g_n\}$ to represent the corresponding demographic group. Given a specific day-part, the system may determine a probability of viewing during the day-part as $\{P_1, \ldots, P_n\}$. An input to the algorithm may include demographic groups G, day-part categories D, and OTT panel data. The output may be a household viewership distribution P using the algorithm:

For each $H \in H$,
Determine the number of households in $C_H$;
For each $h_i \in H$, $$P_i = \frac{\text{number of impressions exposed to } h_i}{\text{number of impressions exposed to } H};$$

$P = P \cup \{g_1, \ldots, g_n, P_1, \ldots, P_n\}$.

At block 410, the device may determine a co-viewership distribution indicating a probability that multiple viewers of a same household view content. To calibrate viewership distribution for co-viewership distribution, the device may map multiple levels of survey answers (e.g., strongly agree, somewhat agree, somewhat disagree, strongly disagree) to probabilities $\{P_1, P_2, P_3, P_4\}$. The number of adults in the third-party labeled survey data and the number of adults in OTT survey data as demographic group g may be represented as $M^g$, $A^g$ respectively. $H_i$ may represent the household of respondent i and $H_i^g$ may represent the number of demographic group g adults in $H_i$ as $H_i^g$. Matching with $OTR_g$, the system may estimate $\{P_1, P_2, P_3, P_4\}$ using $$\frac{\sum_i 1_{g \in H_i \Sigma_j P_j H_i^g + M^g}}{A^g} = OTR_g. \qquad \text{Equation (3)}$$

At block 412, the device may generate a synthetic audience model based on the distributions and models of blocks 404-410. The synthetic audience model may indicate viewing behavior of multiple viewers of multiple households. In this manner, the synthetic audience model learns from the real audience data and the audience behavior across multiple channels to generate a distribution of audience demographics and the viewing behavior of the audience demographics. The synthetic audience model may include multiple parts: the audience growth model, the viewership behavior distribution over different household composition groups, the multi-user household distribution, and the co-viewership distribution. The viewer behavior may indicate which content is viewed at a particular time. Correlating the viewer behavior with the audience demographics may indicate which content is viewed by particular demographics at particular times, allowing for frequency capping and targeted selection of content. The device may replace impression data with the synthetic audience model when the impression data is deleted periodically (e.g., due to a privacy policy). In this manner, the synthetic audience model may replicate the impression data.

At block 414, the device may select OTT advertisements based on the synthetic audience model. The descriptions herein are not meant to be limiting.

Figure 5:
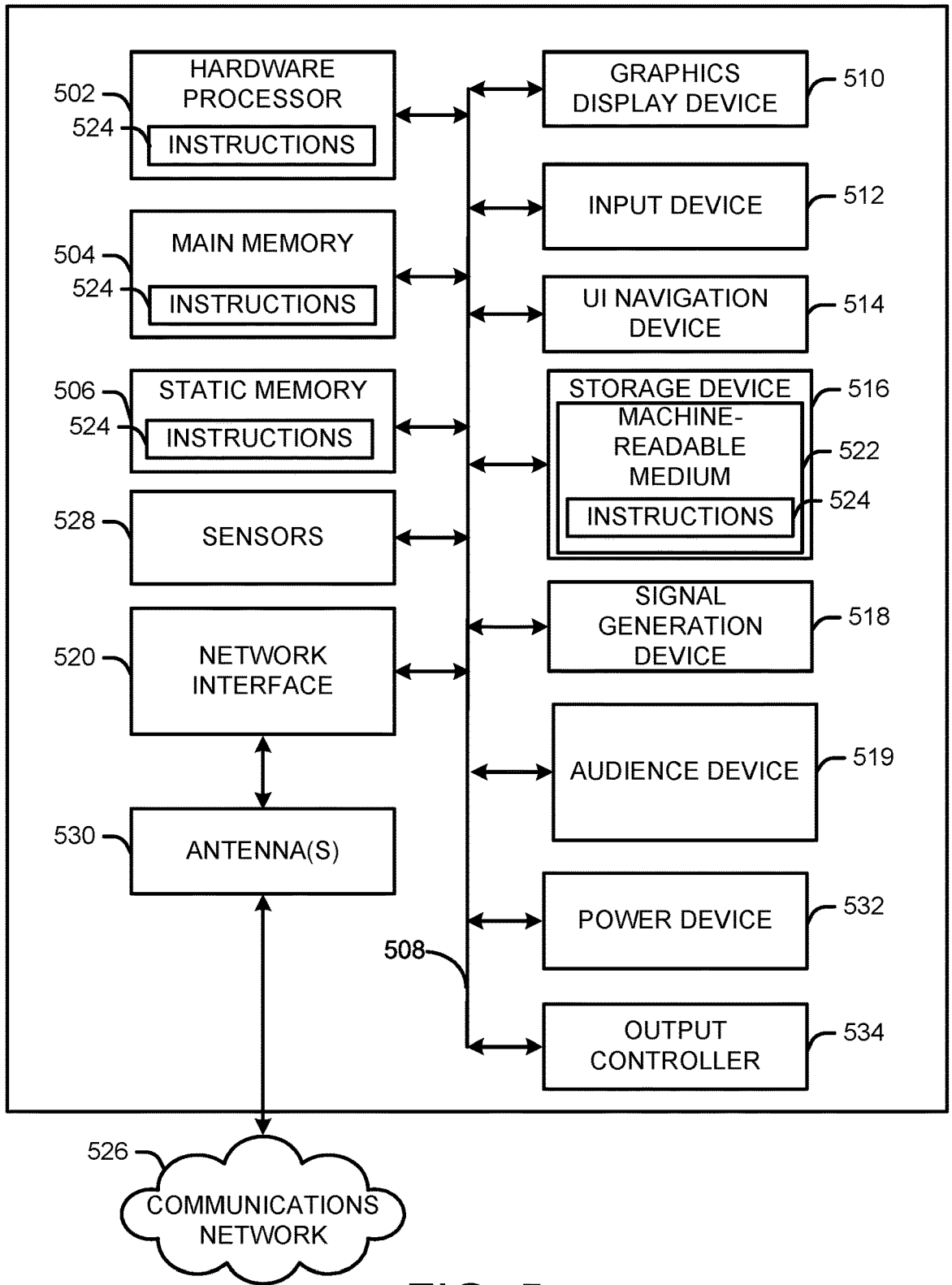
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., system 100 of FIG. 1) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in Wi-Fi direct, peer-to-peer (P2P), cellular, (or other distributed) network environments. The machine 500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532 (e.g., a battery or other power source), a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, an audience device 519 (e.g., capable of performing any of the functions described in FIGS. 1-4), a network interface device/transceiver 520 coupled to antenna(s) 530, and one or more sensors 528, such as a microphone, a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method for predicting an audience, the method comprising:
   receiving, by at least one processor of a system, over-the-top (OTT) advertisement impression data comprising metadata and content of advertisement bid requests, the metadata indicative of scheduled OTT media presentation;
   receiving, by the at least one processor, survey data indicative of day-part times when television viewers watch content;
   determining, by the at least one processor, a number or non-overlapping demographic groups comprising age ranges;
   generating, by the at least one processor, based on the OTT advertisement impression data as training data for a first audience recognition model, a first demographic probability vector, wherein each entry of the first demographic probability vector is indicative of a first probability that an OTT viewer is in a respective age range of the non-overlapping demographic groups;
   generating, by the at least one processor, based on the survey data as training data for a second audience recognition model, a second demographic probability vector, wherein each entry of the second demographic probability vector is indicative of a second probability that a television viewer is in a respective age range of the non-overlapping demographic groups;
   generating, by the at least one processor, based on a combination of the first demographic probability vector and the second demographic probability vector, a third demographic probability vector for the OTT advertisement impression data and the survey data, wherein each entry of the third demographic probability vector is indicative of a third probability that a viewer is in a respective age range of the non-overlapping demographic groups;
   generating, by the at least one processor, a third audience recognition model comprising the third demographic probability vector;
   estimating, by the at least one processor, without deterministic identities of the viewers represented by the third demographic probability vector, a cross-channel exposure of an advertisement to each of the viewers represented by the third demographic probability vector, the cross-channel exposure comprising OTT exposure and television exposure; and generating, by the at least one processor, an audience to which to present an OTT advertisement based on the cross-channel exposure.

2. The method of claim 1, further comprising:

generating, by the at least one processor, a sum of a first product of a value between zero and one and the first demographic probability vector and a second product of a difference between 1 and the value multiplied by the second demographic probability vector, wherein the third demographic probability vector is based on the sum.

3. The method of claim 1, further comprising:

generating, by the at least one processor, a softmax function of an element-wise multiplication of the first demographic probability vector and the second demographic probability vector, wherein the third demographic probability vector is based on the softmax function.

4. The method of claim 1, wherein the content of the advertisement bid requests comprises contextual data indicative of at least one of a content genre, content rating, a device type used for content presentation, a time of a bid request, a day-part time, a day of the week, a month of the year, or a geographic location, wherein user age and gender of a user to whom a user account is registered are included in the content of the advertisement bid requests, and wherein user age and gender for one or more additional users of the user account are absent from the content of the advertisement bid requests, the method further comprising:

determining, by the at least one processor, the first demographic probability vector based on the contextual data.

5. The method of claim 1, wherein the survey data are further indicative of content genre watched by the television viewers, the method further comprising:

generating, by the at least one processor, a first vector indicative of a first demographic group of the non-overlapping demographic groups, a first day-part time, a first indication of a first day of the week, and a first program genre;

generating, by the at least one processor, a second vector indicative of a second demographic group of the non-overlapping demographic groups, a second day-part time, a second indication of a first day of the week, and a second program genre; and generating, by the at least one processor, a sum of the first vector and the second vector, wherein the second demographic probability vector is based on the sum.

6. A method for predicting an audience, the method comprising:

receiving, by at least one processor of a system, over-the-top (OTT) advertisement impression data comprising metadata and content of advertisement bid requests, the metadata indicative of scheduled OTT media presentation;

receiving, by the at least one processor, user activity data indicative of day-part times when television viewers watch content absent from the OTT advertisement impression data;

generating, by the at least one processor, based on the OTT advertisement impression data, a first demographic probability vector, wherein each entry of the first demographic probability vector is indicative of a first probability that an OTT viewer is in a respective age range;

generating, by the at least one processor, based on the user activity data, a second demographic probability vector, wherein each entry of the second demographic probability vector is indicative of a second probability that a television viewer is in a respective age range;

generating, by the at least one processor, based on a combination of the first demographic probability vector and the second demographic probability vector, a third demographic probability vector for the OTT advertisement impression data and the user activity data, wherein each entry of the third demographic probability vector is indicative of a third probability that a viewer is in a respective age range;

estimating, by the at least one processor, without deterministic identities of the viewers represented by the third demographic probability vector, a cross-channel exposure of an advertisement to each of the viewers represented by the third demographic probability vector, the cross-channel exposure comprising OTT exposure and television exposure; and generating, by the at least one processor, an audience to which to present an OTT advertisement based on the cross-channel exposure.

7. The method of claim 6, wherein the user activity data comprises television survey data indicative of when viewers watch television content.

8. The method of claim 6, wherein the user activity data comprises web browser data indicative of when viewers watch OTT content using a web browser.

9. The method of claim 6, further comprising:

generating, by the at least one processor, a sum of a first product of a value between zero and one and the first demographic probability vector and a second product of a difference between 1 and the value multiplied by the second demographic probability vector, wherein the third demographic probability vector is based on the sum.

10. The method of claim 6, further comprising:

generating, by the at least one processor, a softmax function of an element-wise multiplication of the first demographic probability vector and the second demographic probability vector, wherein the third demographic probability vector is based on the softmax function.

11. The method of claim 6, wherein the content of the advertisement bid requests comprises contextual data indicative of at least one of a content genre, content rating, a device type used for content presentation, a time of a bid request, a day-part time, a day of the week, a month of the year, or a geographic location, wherein user age and gender of a user to whom a user account is registered are included in the content of the advertisement bid requests, and wherein user age and gender for one or more additional users of the user account are absent from the content of the advertisement bid requests.

12. The method of claim 6, wherein the user activity data are further indicative of content genre watched by the viewers, the method further comprising:

generating, by the at least one processor, a first vector indicative of a first demographic group, a first day-part time, a first indication of a first day of the week, and a first program genre;

generating, by the at least one processor, a second vector indicative of a second demographic group different than the first demographic group, a second day-part time, a second indication of a first day of the week, and a second program genre; and generating, by the at least one processor, a sum of the first vector and the second vector,
wherein the second demographic probability vector is based on the sum.

13. The method of claim 6, wherein generating the first demographic probability vector is based on the OTT advertisement impression data as training data for a first audience recognition model, and wherein generating the second demographic probability vector is based on the user activity data as training data for a second audience recognition model.

14. The method of claim 6, wherein the system is associated with an OTT streaming service for which each active user has a separate user account, and wherein generating the first demographic probability vector is further based on demographic information provided by respective user accounts.

15. The method of claim 6, further comprising:
selecting, by the at least one processor, an OTT advertisement for presentation based on the third demographic probability vector.

16. The method of claim 11, further comprising:
determining, by the at least one processor, the first demographic probability vector based on the contextual data.

17. The method of claim 14, further comprising:
receiving, by the at least one processor, survey data from users of the OTT streaming service, the survey data comprising single adult household data and multi-active user household data, and the survey data indicative of OTT advertisement impressions,
wherein generating the first demographic probability vector is further based on the survey data.

18. A system comprising at least one processor coupled to memory, the at least one processor configured to:
receive over-the-top (OTT) advertisement impression data comprising metadata and content of advertisement bid requests, the metadata indicative of scheduled OTT media presentation;
receive user activity data indicative of day-part times when television viewers watch content absent from the OTT advertisement impression data;
generate, based on the OTT advertisement impression data, a first demographic probability vector, wherein each entry of the first demographic probability vector is indicative of a first probability that an OTT viewer is in a respective age range;
generate, based on the user activity data, a second demographic probability vector, wherein each entry of the second demographic probability vector is indicative of a second probability that a television viewer is in a respective age range;
generate, based on a combination of the first demographic probability vector and the second demographic probability vector, a third demographic probability vector for the OTT advertisement impression data and the user activity data, wherein each entry of the third demographic probability vector is indicative of a third probability that a viewer is in a respective age range;
estimate, without deterministic identities of the viewers represented by the third demographic probability vector, a cross-channel exposure of an advertisement to each of the viewers represented by the third demographic probability vector, the cross-channel exposure comprising OTT exposure and television exposure; and
generate an audience to which to present an OTT advertisement based on the cross-channel exposure.

19. The system of claim 18, wherein the at least one processor is further configured to:
generate a sum of a first product of a value between zero and one and the first demographic probability vector and a second product of a difference between 1 and the value multiplied by the second demographic probability vector,
wherein the third demographic probability vector is based on the sum.

20. The system of claim 18, wherein the at least one processor is further configured to:
generate a softmax function of an element-wise multiplication of the first demographic probability vector and the second demographic probability vector,
wherein the third demographic probability vector is based on the softmax function.

* * * * *